United States Patent
Chang et al.

(10) Patent No.: US 9,426,678 B2
(45) Date of Patent: Aug. 23, 2016

(54) IMPLEMENTING DUAL-HOMED NODE PROTECTION

(71) Applicant: Hangzhou H3C Technologies Co., Ltd., Hangzhou, Zhejiang (CN)

(72) Inventors: Xiangqing Chang, Beijing (CN); Zhonghua Gao, Beijing (CN); Min Yao, Beijing (CN); Jianfeng Liu, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 104 days.

(21) Appl. No.: 14/359,914

(22) PCT Filed: Jan. 17, 2013

(86) PCT No.: PCT/CN2013/070577
§ 371 (c)(1),
(2) Date: May 22, 2014

(87) PCT Pub. No.: WO2013/107356
PCT Pub. Date: Jul. 25, 2013

(65) Prior Publication Data
US 2014/0334292 A1  Nov. 13, 2014

(30) Foreign Application Priority Data

Jan. 20, 2012  (CN) .......................... 2012 1 0019235

(51) Int. Cl.
*H04L 12/28* (2006.01)
*G06F 15/173* (2006.01)
(Continued)

(52) U.S. Cl.
CPC .......... *H04W 24/04* (2013.01); *H04L 41/0668* (2013.01)

(58) Field of Classification Search
CPC ....... H04L 45/00; H04L 45/22; H04L 45/30; H04L 43/0811
See application file for complete search history.

(56) References Cited

U.S. PATENT DOCUMENTS 7,990,852 B1 * 8/2011 Cirkovic ................. H04L 45/00
                                                       370/228
2002/0184387 A1 * 12/2002 Yamaya ................. H04L 45/00
                                                       709/238
(Continued)

FOREIGN PATENT DOCUMENTS

CN        101094102     12/2007
CN        101252427      8/2008
(Continued)

OTHER PUBLICATIONS

International Search Report and Written Opinion dated Apr. 25, 2013, issued on PCT Patent Application No. PCT/CN2013/070577 filed on Jan. 17, 2013, The State Intellectual Property Office, the P.R. China.

*Primary Examiner* — Melanie Jagannathan
(74) *Attorney, Agent, or Firm* — Mannava & Kang, P.C.

(57) ABSTRACT

A method is provided for a master apparatus of a Virtual Router Redundancy Protocol (VRRP) in a dual-homed node that is a part of a dual-homed network to implement a Layer 3 apparatus. The dual-homed network includes the dual-homed node and a Layer 2 MPLS-Transport Profile (MPLS-TP) network. The method includes monitoring a state of an uplink, when the monitoring detects that the uplink has a failure, notifying an original backup apparatus of the VRRP to perform a master-backup switch, and notifying a downlink apparatus of the master apparatus of the VRRP that a remote link has a failure, thereby causing the downlink apparatus to switch a working channel within the MPLS-TP network. The method includes, when a notification indicating that the master-backup switch has been performed is received from the original backup apparatus of the VRRP, switching to a backup apparatus of the VRRP.

9 Claims, 7 Drawing Sheets (51) Int. Cl.
*H04W 24/04* (2009.01)
*H04L 12/24* (2006.01)

(56) References Cited

U.S. PATENT DOCUMENTS

2004/0085965 A1* 5/2004 Fotedar ................... H04L 45/00
  370/395.31
2006/0149851 A1* 7/2006 Matsumoto ............. H04L 45/00
  709/238
2008/0034112 A1* 2/2008 Imai ........................ H04L 45/00
  709/238

FOREIGN PATENT DOCUMENTS

| CN | 101267392 | 9/2008 |
| CN | 101964718 | 2/2011 |
| CN | 102448095 | 5/2012 |

\* cited by examiner

|version information | OAM packet type | OAM packet contents |reserved area | end symbol|

IMPLEMENTING DUAL-HOMED NODE PROTECTION

CROSS-REFERENCE TO RELATED APPLICATIONS

The present application is a 371 application of International Application No. PCT/CN2013/070577 filed on Jan. 17, 2013 and entitled "Implementing Dual-Homed Node Protection," which claims the benefit of Chinese Patent Application No. 201210019235.6 filed on Jan. 20, 2012.

BACKGROUND

As mobile technology develops from 3rd Generation Mobile Communications System (3G) to Long Term Evolution technology (LTE), it is needed for a Mobile Backhaul Network, when supporting 51 traffic between a LTE base station and a core network apparatus, to support X2 traffic between LTE base stations at the same time.

In order to avoid that communications among a large number of base stations are affected by a faulty apparatus, generally, two Layer 3 Forwarding apparatuses are introduced, and thereby a dual-homed node is formed.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure will be described in further detail with reference to the accompanying drawings and examples to make the technical solution and merits therein clearer.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
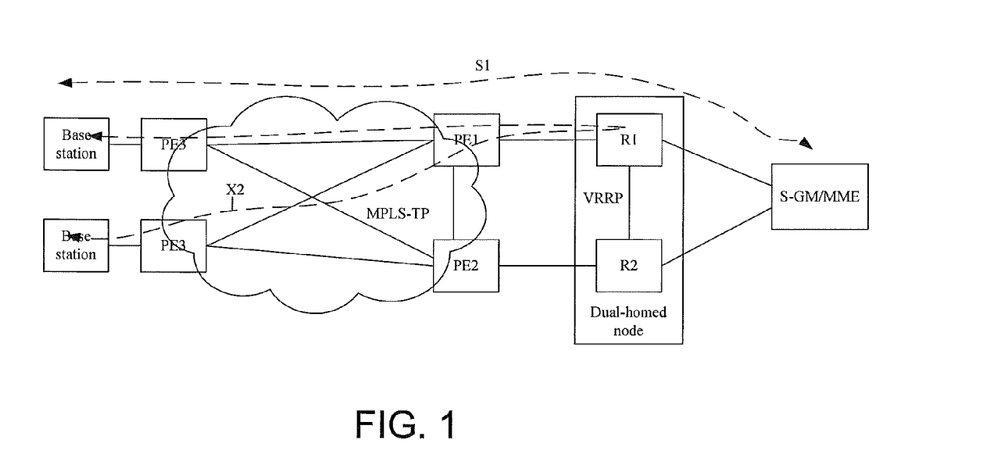
FIG. 1 is a schematic diagram illustrating a dual-homed network for implementing a Layer 3 apparatus in communications technologies.

FIG. 1 is a schematic diagram illustrating a dual-homed network for implementing a Layer 3 apparatus in communications technologies. As shown in FIG. 1, after accessing a network, 51 traffic between a base station and a core network apparatus, such as a Serving Gateway (S-GW) or a Mobility Management Entity (MME), reaches R1 through a Layer 2 MPLS-Transport Profile (MPLS-TP) network, wherein R1 is a master apparatus of a Virtual Router Redundancy Protocol (VRRP), and is connected to the core network apparatus through Layer 3 forwarding. After accessing the network, X2 traffic between base stations reaches R1 through the Layer 2 MPLS-TP network, and then achieves communications between the base stations through the Layer 3 forwarding. In the Layer 2 MPLS-TP network, the guarantee reliability is protected through a Label Switched Path (LSP) or a Pseudo Wire (PW).

In order to achieve the dual-homed protection with a Layer 3 apparatus, a general technology solution is as follows: for a downlink, R1/R2 is taken as a Layer 3 gateway of a base station, the VRRP is deployed, and a dual-homed node is taken as a virtual single apparatus by the base station. For an uplink, Layer 3 routing is achieved by enabling either dynamic routing or static routing between R1/R2 and the core network apparatus. Herein, through a configuration, the S-GW/MME considers that a priority of a path from the S-GW/MME to R1 is higher than that of a path from the S-GW/MME to R2, and the path from the S-GW/MME to R1 is considered as a master path, which corresponds to the master apparatus in the VRRP.

Figure 2:
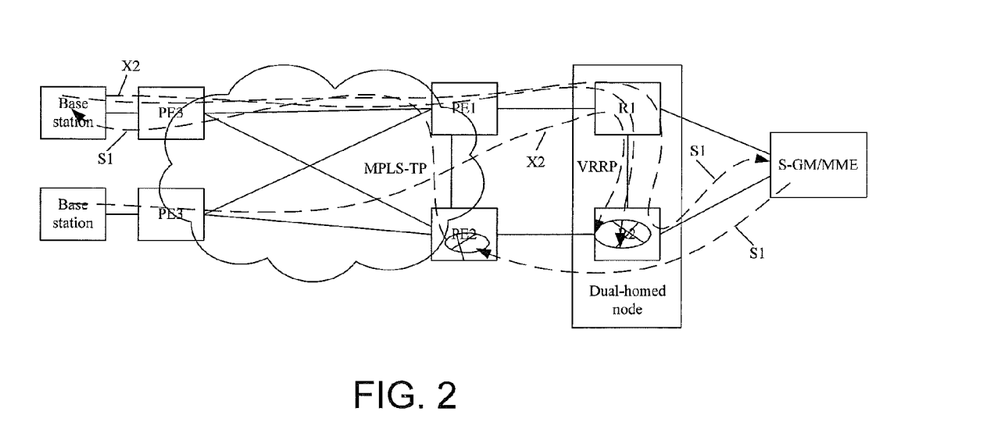
FIG. 2 is a schematic diagram illustrating a structure of a dual-homed network for implementing a Layer 3 apparatus when an access link has a failure in communications technologies.

FIG. 2 is a schematic diagram illustrating a structure of a dual-homed network for implementing a Layer 3 apparatus when an access link has a failure in communications technologies. As shown in FIG. 2, when the access link has a failure (i.e., a link between R1 and S-GW/MME has a failure), S1 traffic is forwarded to R2 by R1, and then forwarded to the core network apparatus through R2; S1 traffic sent from the core network apparatus to the base station is sent to R2 firstly, then is forwarded by R2 to a Provider Edge (PE) 2, and then, PE2 discards the S1 traffic sent from the core network apparatus, or forwards to PE1 by force. Therefore, when the access link has a failure, round trip paths between the base station and the core network apparatus appear inconsistent, or a link from the core network apparatus to the base station is disconnected.

The present disclosure discloses a method and an apparatus for implementing dual-homed node protection, which can solve problem that the round trip paths between the base station and the core network apparatus appear inconsistent or a link from the core network apparatus to the base station is disconnected when the access link has a failure.

Figure 3:
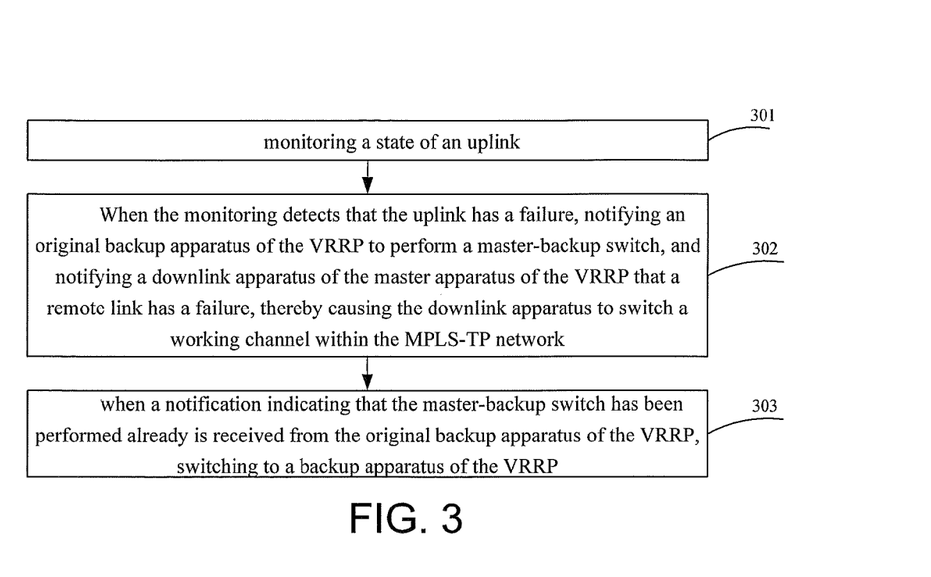
FIG. 3 is a flowchart illustrating a method for implementing dual-homed node protection according to an example of the present disclosure.

The present disclosure discloses a method for implementing dual-homed node protection, which is applied to a dual-homed network for implementing a Layer 3 apparatus, wherein the dual-homed network includes a dual-homed node and a Layer 2 MPLS-TP network, the dual-homed node includes two apparatuses and a master apparatus is determined according to priorities of the apparatuses. In one or more examples of the present disclosure, when any one of the two apparatuses in the dual-homed node is taken as a master apparatus of VRRP, as shown in FIG. 3, the method includes:

block 301, monitoring a state of an uplink;

block 302, when the monitoring detects that the uplink has a failure, notifying an original backup apparatus of the VRRP to perform a master-backup switch, and notifying a downlink apparatus of the master apparatus of the VRRP that a remote link has a failure, thereby causing the downlink apparatus to switch a working channel within the MPLS-TP network; and block 303, when a notification indicating that the master-backup switch has been performed already is received from the original backup apparatus of the VRRP, switching to a backup apparatus of the VRRP.

Figure 4:
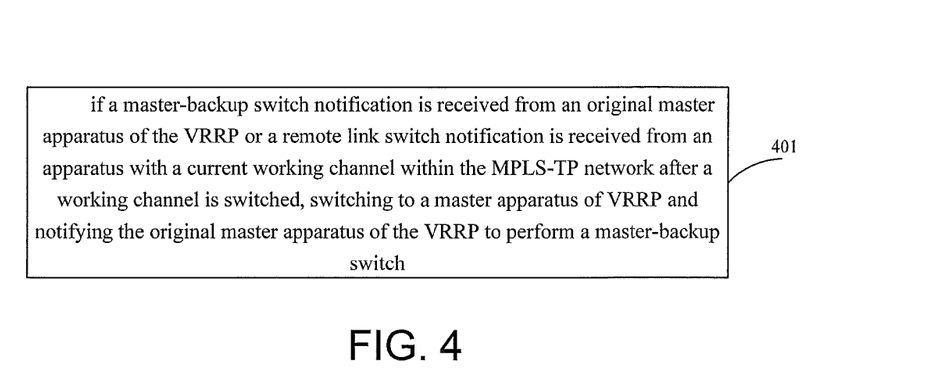
FIG. 4 is a flowchart illustrating a method for implementing dual-homed node protection according to an example of the present disclosure.

The present disclosure further discloses a method for implementing dual-homed node protection, which is applied to a dual-homed network for implementing a Layer 3 apparatus, wherein the dual-homed network includes a dual-homed node and a Layer 2 MPLS-TP network. In one more examples of the present disclosure, when any one of the two apparatuses in the dual-homed node is taken as a backup apparatus of VRRP, as shown in FIG. 4, the method includes:

block 401, if a master-backup switch notification is received from an original master apparatus of the VRRP, or a remote link switch notification is received from an apparatus with a current working channel within the MPLS-TP network after the working channel is switched, switching to a master apparatus of VRRP and notifying the original master apparatus of the VRRP to perform a master-backup switch.

The present disclosure further provides an apparatus for implementing dual-homed node protection which is applied to a dual-homed network for implementing a Layer 3 apparatus, wherein the dual-homed network includes a dual-homed node and a Layer 2 MPLS-TP network. In one or more examples of the present disclosure, the apparatus includes a memory, a processor and a network card; wherein:

the memory is adapted to store computer instructions;

when an apparatus with the processor is a master apparatus of VRRP, the processor is adapted to perform following operations through performing the computer instructions stored in the memory:

monitoring a state of an uplink;

when the monitoring detects that the uplink has a failure, notifying, through the network card, an original backup apparatus of the VRRP to perform a master-backup switch, and notifying, through the network card, a downlink apparatus of the master apparatus of the VRRP that a remote link has a failure, thereby causing the downlink apparatus to switch a working channel within the MPLS-TP network; and when a notification indicating that the master-backup switch has been performed already is received through the network card from the original backup apparatus of the VRRP, switching to a backup apparatus of the VRRP.

The present disclosure further provides an apparatus for implementing dual-homed node protection, which is applied to a dual-homed network for implementing a Layer 3 apparatus, wherein the dual-homed network includes a dual-homed node and a Layer 2 MPLS-TP network. In one or more examples of the present disclosure, the apparatus includes a memory, a processor and a network card; wherein:

the memory is adapted to store computer instructions;

when an apparatus with the processor is a backup apparatus of VRRP, the processor is adapted to perform following operations through performing the computer instructions stored in the memory:

if a master-backup switch notification is received through the network card from an original master apparatus of VRRP, or a remote link switch notification is received through the network card from an apparatus with a current working channel within the MPLS-TP network after the working channel is switched, switching to a master apparatus of VRRP, and notifying, through the network card, the original master apparatus of VRRP to perform a master-backup switch.

The present disclosure further provides an apparatus for implementing dual-homed node protection, which is applied to a dual-homed network for implementing a Layer 3 apparatus, wherein the dual-homed network includes a dual-homed node and a Layer 2 MPLS-TP network. In one or more examples of the present disclosure, the apparatus within the MPLS-TP connected with an apparatus in the dual-homed node includes a memory, a processor and a network card; wherein:

the memory is adapted to store computer instructions;

the processor is adapted to perform following operations through performing the computer instructions stored in the memory:

receiving, through the network card, a remote link failure notification sent by a master apparatus of VRRP;

when a remote link failure notification sent by a master apparatus of VRRP is received through the network card, switching, according to a MPLS-TP implementation mode configured for the apparatus, a working channel within MPLS-TP network; and when a working channel within the MPLS-TP network is switched, and a current working channel within the MPLS-TP network after the working channel switch is located on the apparatus with the processor, notifying, through the network card, an uplink apparatus of the apparatus with the processor that a remote link is switched to cause the uplink apparatus to complete a master-backup switch within VRRP.

Figure 5:
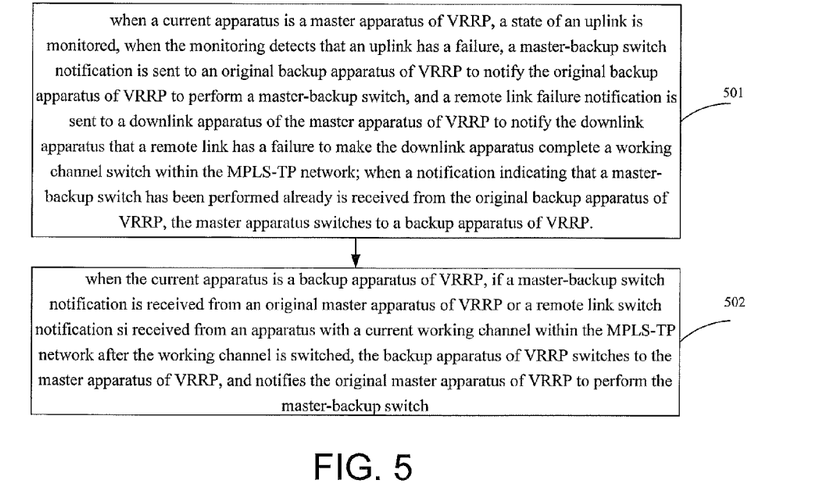
FIG. 5 is a flowchart illustrating a method for implementing dual-homed node protection according to an example of the present disclosure.

FIG. 5 is a flowchart illustrating a method for implementing dual-homed node protection according to an example of the present disclosure. The specific operations are as follows.

Block 501, when a current apparatus is a master apparatus of VRRP, a state of an uplink is monitored, when the monitoring detects that the uplink has a failure, a master-backup switch notification is sent to an original backup apparatus of VRRP to notify the original backup apparatus of VRRP to perform a master-backup switch, and a remote link failure notification is sent to a downlink apparatus of the master apparatus of VRRP to notify the downlink apparatus that a remote link has a failure to make the downlink apparatus complete a working channel switch within the MPLS-TP network; when a notification indicating that a master-backup switch has been performed already is received from the original backup apparatus of VRRP, the master apparatus switches to a backup apparatus of VRRP.

In block 501, the master apparatus of VRRP monitors that the uplink has a failure, i.e., an access link fails. When the current apparatus is the master apparatus of VRRP, a method for notifying the original backup apparatus of VRRP to perform a master-backup switch includes:

reducing a priority of the master apparatus to make the reduced priority lower than a priority of the original backup apparatus of VRRP; and notifying the reduced priority to the original backup apparatus of VRRP.

In block 501, when the current apparatus is the master apparatus of VRRP, if a notification indicating that the master-backup switch has been performed already is received from an original backup apparatus of VRRP, a method for switching to the backup apparatus of VRRP includes:

receiving a notification carrying a priority of the original backup apparatus of VRRP sent by the original backup apparatus of VRRP; and when the priority of the original backup apparatus of VRRP carried by the notification is higher than the priority of the master apparatus of VRRP, switching to a backup apparatus of VRRP.

Block 502, when the current apparatus is a backup apparatus of VRRP, if a master-backup switch notification is received from an original master apparatus of VRRP or a remote link switch notification is received from an apparatus with a current working channel within the MPLS-TP network after the working channel is switched, the backup apparatus of VRRP switches to the master apparatus of VRRP, and notifies the original master apparatus of VRRP to perform the master-backup switch.

In block 502, when the current apparatus is the backup apparatus of VRRP, if the master-backup switch notification is received from the original master apparatus of VRRP, a method for switching to the master apparatus of VRRP, and notifying the original master apparatus of VRRP to perform the master-backup switch includes:

receiving a notification carrying a priority of the original master apparatus of VRRP sent by the original master apparatus of VRRP; and when the priority of the original master apparatus of VRRP carried by the notification is lower than a priority of the backup apparatus of VRRP, switching to the master apparatus of VRRP, and notifying the original master apparatus of VRRP to perform the master-backup switch.

In block 502, when the current apparatus is the backup apparatus of VRRP, if the remote link switch notification sent by the apparatus with the current working channel within the MPLS-TP network after the working channel switch is received, a method for switching to the master apparatus of VRRP and notifying the original master apparatus of VRRP to perform the master-backup switch includes:

increasing the priority of the backup apparatus to make the increased priority higher than a priority of the original master apparatus of VRRP;

switching to the master apparatus of VRRP; and sending a notification carrying the increased priority of the backup apparatus of VRRP to notify the original master apparatus of VRRP to perform the master-backup switch.

When receiving a remote link failure notification sent by a master apparatus of VRRP which monitors a failure, an apparatus within MPLS-TP completes the working channel switch in the MPLS-TP network, wherein the working channel switch occurs in the MPLS-TP network and is performed by the apparatus within the MPLS-TP network according to a MPLS-TP implementation mode configured for the apparatus itself.

The above-mentioned working channel switch performed by the apparatus within the MPLS-TP network according to the MPLS-TP implementation mode configured for the apparatus within the MPLS-TP network includes two modes as follows:

the apparatus within the MPLS-TP network notifying an apparatus with a protection channel in the MPLS-TP network, and negotiating with the apparatus with the protection channel to complete the work channel switch within the MPLS-TP network; or the apparatus within MPLS-TP network notifying a downlink apparatus of a current master apparatus of VRRP that the remote link has a failure, negotiating with the downlink apparatus of the current master apparatus of VRRP to establish a channel which makes traffic in the working channel communicate with traffic in the channel established through negotiating, and making the downlink apparatus of the current master apparatus of VRRP establish a communication channel between the traffic in the channel established through negotiating and the traffic of the current master apparatus of VRRP.

The above-mentioned apparatus sending the remote link switch notification is the apparatus with the current working channel within the MPLS-TP network after the working channel is switched, therefore, if an apparatus within the VRRP which receives the remote link switch notification is the master apparatus of VRRP, the remote link switch notification is not processed; if the apparatus within the VRRP which receives the remote link switch notification is the backup apparatus of VRRP, the backup apparatus needs to increase a priority of the backup apparatus itself to make the increased priority higher than a priority of the original master apparatus of VRRP, switches to the master apparatus of VRRP, and notifies the original master apparatus of VRRP to perform the master-backup switch.

Hereinafter, the present disclosure will be described in further detail with reference to the accompanying drawings and examples to explain how the dual-homed node protection is achieved.

For X2 traffic forwarding and S1 traffic forwarding, a path passed by the S1 traffic is longer than a path passed by the X2 traffic, and the path passed by the X2 traffic is part of the path passed by the S1 traffic, therefore, if the S1 traffic forwarding is ensured, the X2 traffic forwarding is not a problem, thus, examples of the present disclosure take the S1 traffic forwarding as an example to describe how the dual-homed node protection is achieved.

Figure 6:
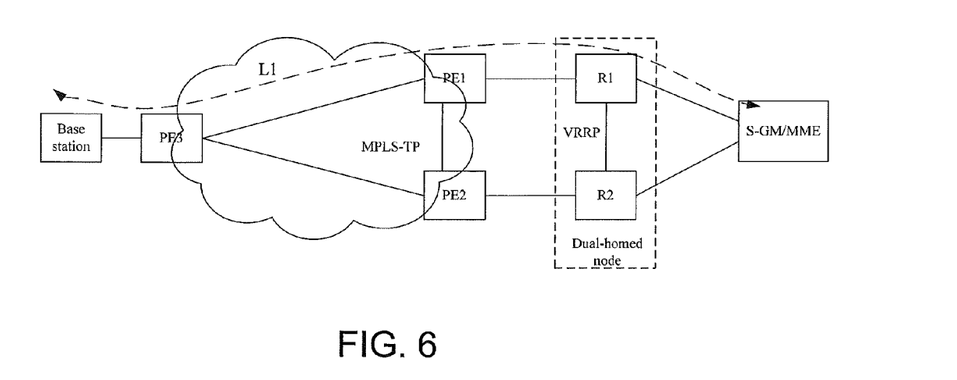
FIG. 6 is a schematic diagram illustrating a structure of a network for implementing dual-homed node protection when an access link does not have a failure according to an example of the present disclosure.

FIG. 6 is a schematic diagram illustrating a structure of a network for implementing dual-homed node protection when an access link does not have a failure according to an example of the present disclosure. In FIG. 6, R1 is a master apparatus of VRRP, R2 is a backup apparatus of VRRP, a channel between PE3 and PE1 is a working channel, and a channel between PE3 and PE2 is a protection channel. In FIG. 6, L1 is a forwarding path of the S1 traffic between a base station and a core network apparatus.

In FIG. 6, when monitoring that an uplink has a failure, R1 reduces a priority of R1 itself to make the reduced priority lower than a priority of R2, notifies the reduced priority to R2, and notifies PE1 that a remote link has a failure. R2 receives a notification carrying the priority of R1 sent by R1, obtains the priority of R1, compares the priority of R1 with a priority of R2, as the priority of R2 is higher than the priority of R1, R2 switches to the master apparatus of VRRP, and notifies R1. R1 receives a notification sent by R2, and obtains the priority of R2 carried by the notification, compares the priority of the R2 with the priority of R1, as the priority of R1 is lower than the priority of R2, R1 switches to the backup apparatus of VRRP. As such, the master-backup switch of the VRRP is completed. After receiving a remote link failure notification sent by R1, PE1 performs a working channel switch within MPLS-TP network according to a MPLS-TP implementation mode configured for PE1. The following two examples are illustrated to explain processes that PE1 performs the working channel switch within MPLS-TP network according to the MPLS-TP implementation mode configured for PE1.

Figure 7:
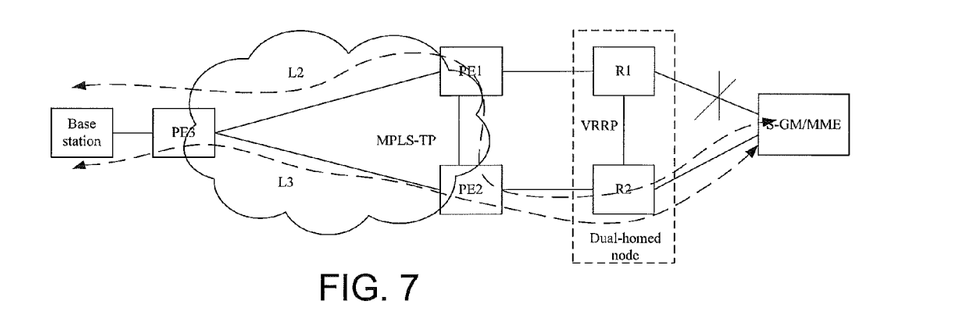
FIG. 7 is a schematic diagram illustrating a structure of a network for implementing dual-homed node protection when an access link has a failure according to an example of the present disclosure.

The first mode is to notify PE3 and PE2 to switch correspondingly, which includes: PE1 notifying PE3 that the remote link has a failure, PE3 switching the working channel to PE2. FIG. 7 is a schematic diagram illustrating a structure of a network for implementing dual-homed node protection when an access link has a failure according to an example of the present disclosure. In FIG. 7, L3 is the forwarding path of the S1 traffic between a base station and a core network apparatus after the working channel within the MPLS-TP network is switched according to the first switch mode when R1 monitors that the remote link has a failure in accordance with the example of the present disclosure.

The second mode includes: the PE1 notifying PE2 that there is a failure, negotiating with PE2 to establish a channel between PE1 and PE2, and being further responsible for establishing a communication channel between the traffic of PE3 and the traffic in the channel between PE1 and PE2; PE2 being responsible for establishing a communication channel between the traffic of R2 and the traffic in the channel between PE1 and PE2. In FIG. 7, L2 is the forwarding path of the S1 traffic between a base station and a core network apparatus after the working channel within the MPLS-TP network is switched according to the second switch mode when R1 monitors that the remote link has a failure in accordance with the example of the present disclosure.

In FIG. 6, when a working channel within the MPLS-TP network has a failure, i.e., the working channel between PE3 and PE1 fails, a working channel switch occurs within the MPLS-TP network, the PE2 with the new working channel sends a remote link switch notification to R2 to notify R2 that a remote link has a failure; R2 receives the notification, increases a priority of R2 to make the increased priority higher than a priority of the R1, switches to the master apparatus of VRRP and sends a notification to R1; R1 receives the notification sent by R2, obtains the priority of R2 carried in the notification, determines that the priority of R2 carried in the notification is higher than the priority of R1, and then switches to the backup apparatus of VRRP.

Figure 8:
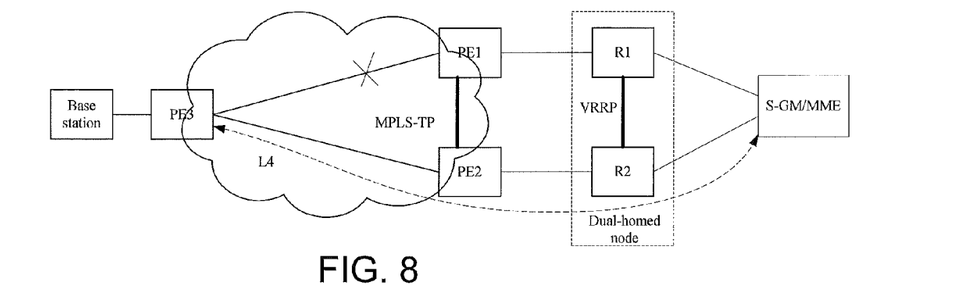
FIG. 8 is a schematic diagram illustrating a structure of a network for implementing dual-homed node protection when a failure occurs in a MPLS-TP network according to an example of the present disclosure.

FIG. 8 is a schematic diagram illustrating a structure of a network for implementing dual-homed node protection when a failure occurs in a MPLS-TP network according to an example of the present disclosure. In FIG. 8, L4 is a forwarding path of the S1 traffic between a base station and a core network apparatus.

If an uplink apparatus notified by a remote link switch notification sent from an apparatus with a current working channel within the MPLS-TP network after the working channel is switched is a master apparatus of VRRP, the master apparatus of VRRP does not process the notification, and a master-backup state of the VRRP remains unchanged.

In the example of the present disclosure, that R1 notifies PE1 that the remote link has a failure and PE2 notifies R2 that the remote link is switched may be implemented either through an Operation Administration and Maintenance (OAM) packet or through newly-added information of an available packet, as long as these two packets can be distinguished. Hereinafter a packet format is taken as an example to explain how to achieve a notification packet in the present disclosure.

Figure 9:
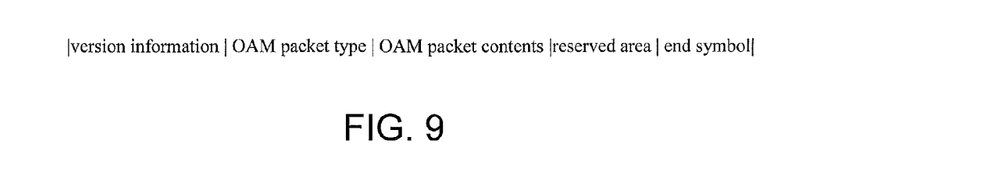
FIG. 9 is a schematic diagram illustrating a format of an OAM packet according to an example of the present disclosure.

A new OAM packet type being newly added in an OAM packet is illustrated as follows. FIG. 9 is a schematic diagram illustrating a format of an OAM packet according to an example of the present disclosure. Based on the packet format shown in FIG. 9, the example of the present disclosure adds a value for a field of "OAM packet type", such as 0x40, i.e., a packet type 0x40 represents that the remote link has a failure and the VRRP is required to coordinate with the switch.

The new information being newly added in an OAM packet is illustrated as follows. The value of the field of "OAM packet type" shown in FIG. 9 is not added, but a special flag is defined in a reserved area, that the flag is set as 1 represents that the remote link has a failure and the VRRP is required to coordinate with the switch.

In examples of the present disclosure, R1 and PE1, as well as R2 and PE2 may be deployed either in a centralized or distributed configuration. When a centralized implementation way is used, a notification mode among the above-mentioned apparatuses changes from a linkage notification mode to a notification mode among different modules or units within the same apparatus, and other implementation logics are the same, which are not repeated here again.

Either dynamic routing or static routing may be configured between R1/R2 and S-GM/MME; similarly, a speed for switching a routing path under a failure may be accelerated through deploying Fast Reroute (FRR), the implementations are consistent with those of conventional systems, which are not repeated here again.

Figure 10:
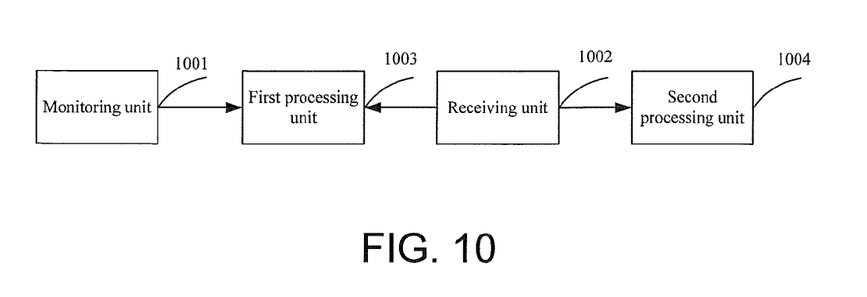
FIG. 10 is a schematic diagram illustrating a structure of any one apparatus in two apparatuses within a dual-homed node according to an example of the present disclosure.

Based on the same inventive concept, the present disclosure discloses an apparatus for implementing dual-homed node protection which is applied to a dual-homed network for implementing a Layer 3 apparatus, wherein the dual-homed network includes a dual-homed node and a Layer 2 MPLS-TP network. FIG. 10 is a schematic diagram illustrating a structure of any one apparatus of two apparatuses within a dual-homed node according to an example of the present disclosure. For any one apparatus of two apparatuses in a dual-homed node, the apparatus includes a monitoring unit 1001, a receiving unit 1002, a first processing unit 1003 and a second processing unit 1004.

The monitoring unit 1001 is adapted to monitor a state of an uplink when the apparatus with the monitoring unit 1001 is a master apparatus of VRRP;

The receiving unit 1002 is adapted to receive a notification indicating that a master-backup switch has been performed already sent by an original backup apparatus of VRRP; receive a master-backup switch notification sent by an original master apparatus of VRRP; or receive a remote link switch notification sent by an apparatus with a current working channel within the MPLS-TP network locates after the working channel is switched.

When the monitoring unit 1001 monitors that the uplink has a failure, the first processing unit 1003 is adapted to send a master-backup switch notification to an original backup apparatus of VRRP to notify the original backup apparatus of VRRP to perform a master-backup switch, and send a remote link failure notification to a downlink apparatus of the master apparatus of VRRP to notify the downlink apparatus that a remote link has a failure, thereby causing the downlink apparatus to complete a working channel switch within the MPLS-TP network; when the receiving unit 1002 receives a notification indicating that the master-backup switch has been performed already sent by the original backup apparatus of VRRP, the first processing unit 1003 is adapted to switch the apparatus with the first processing unit 1003 to a backup apparatus of VRRP.

If the apparatus with the second processing unit 1004 is a backup apparatus of VRRP, when the receiving unit 1002 receives a master-backup switch notification sent by an original master apparatus of VRRP, or receives a remote link switch notification sent by an apparatus with a current working channel within the MPLS-TP network after a working channel is switched, the second processing unit 1004 is adapted to switch the apparatus with the second processing unit 1004 to a master apparatus of VRRP, and notify the original master apparatus of VRRP to perform the master-backup switch.

If the apparatus with the second processing unit 1004 is a backup apparatus of VRRP, the second processing unit 1004 is further adapted to receive a notification carrying a priority of the original master apparatus of VRRP sent by the original master apparatus of VRRP, and when the priority of the original master apparatus of VRRP carried by the notification is lower than a priority of the apparatus with the second processing unit 1004, the second processing unit 1004 is adapted to switch the apparatus with the second processing unit 1004 to a master apparatus of VRRP, and notify the original master apparatus of VRRP to perform the master-backup switch.

If the apparatus with the second processing unit 1004 is the backup apparatus of VRRP, the second processing unit 1004 is further adapted to increase the priority of the apparatus with the second processing unit 1004 to make the increased priority higher than a priority of the original master apparatus of VRRP, switch the apparatus with the second processing unit 1004 to a master apparatus of VRRP, and carry the increased priority of the apparatus with the second processing unit 1004 to notify the original master apparatus of VRRP to perform the master-backup switch.

If the apparatus with the first processing unit 1003 is the master apparatus of VRRP, the first processing unit 1003 is further adapted to reduce a priority of the apparatus with the first processing unit 1003 to make the priority lower than a priority of the original backup apparatus of VRRP, and notify the reduced priority to the original backup apparatus of VRRP.

If the apparatus with the first processing unit 1003 is the master apparatus of VRRP, the first processing unit 1003 is further adapted to receive a notification carrying a priority of the original backup apparatus of VRRP sent by the original backup apparatus of VRRP, and switch the apparatus with the first processing unit 1003 to a backup apparatus of VRRP when the priority of the original backup apparatus of VRRP carried by the notification is higher than a priority of the apparatus with the first processing unit 1003.

Figure 11:
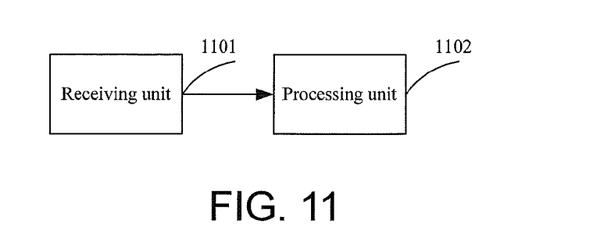
FIG. 11 is a schematic diagram illustrating a structure of an apparatus within a MPLS-TP network connected with an apparatus in a dual-homed node according to an example of the present disclosure.

The present disclosure further discloses an apparatus for implementing dual-homed node protection which is applied to a dual-homed network for implementing a Layer 3 apparatus, wherein the dual-homed network includes a dual-homed node and a Layer 2 MPLS-TP network. FIG. 11 is a schematic diagram illustrating a structure of an apparatus within a MPLS-TP network connected with an apparatus in a dual-homed node according to an example of the present disclosure. For the apparatus within the MPLS-TP network connected with an apparatus in the dual-homed node, the apparatus includes a receiving unit 1101 and a processing unit 1102.

The receiving unit 1101 is adapted to receive a remote link failure notification sent by a master apparatus of VRRP.

When the receiving unit 1101 receives the remote link failure notification sent by the master apparatus of VRRP, the processing unit 1102 is adapted to switch a working channel within the MPLS-TP network according to a MPLS-TP implementation mode configured for the apparatus with the processing unit 1102; when a working channel within the MPLS-TP network is switched, and a current working channel within the MPLS-TP network after the working channel is switched is located on the apparatus with the processing unit 1102, the processing unit 1102 is adapted to notify an uplink apparatus of the apparatus with the processing unit 1102 that a remote link is switched to make the uplink apparatus complete a master-backup switch within the VRRP.

The processing unit 1102 is further adapted to notify an apparatus with a protection channel within the MPLS-TP network, and negotiate with the apparatus with the protection channel to complete the work channel switch within the MPLS-TP network; or the processing unit 1102 is further adapted to notify a downlink apparatus of a current master apparatus of VRRP that the remote link has a failure, negotiate with the downlink apparatus of the current master apparatus of VRRP to establish a channel which makes traffic in the working channel communicate with traffic in the channel established through negotiating, and makes the downlink apparatus of the current master apparatus of VRRP establish a communication channel between the traffic in the channel established through negotiating and the traffic of the current master apparatus of VRRP.

The above-mentioned units in the examples of the present disclosure may be deployed either in a centralized or distributed configuration; and may be either merged into a single unit, or further split into a plurality of sub-units.

When being applied practically, the method and apparatus for implementing the dual-homed node protection provided by the examples of the present disclosure need to be realized based on hardware architecture of an apparatus which applies the method and apparatus for implementing the dual-homed node protection.

Figure 12:
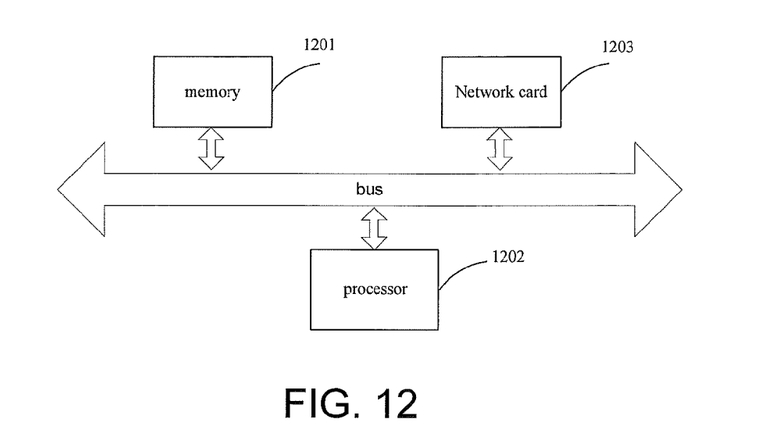
FIG. 12 is a schematic diagram illustrating a physical structure of an apparatus for implementing dual-homed node protection shown in FIG. 10 according to an example of the present disclosure.

FIG. 12 is a schematic diagram illustrating a physical structure of an apparatus for implementing the dual-homed node protection shown in FIG. 10 according to an example of the present disclosure. The apparatus includes a memory 1201, a processor 1202 and a network card 1203, wherein:

the memory 1201 is adapted to store computer instructions;

when an apparatus with the processor 1202 is a master apparatus of VRRP, the processor 1202 is adapted to perform following operations through performing the computer instructions stored in the memory 1201:

monitoring a state of an uplink;

when the monitoring detects that the uplink has a failure, sending, through the network card 1203, a master-backup switch notification to an original backup apparatus of the VRRP to notify the original backup apparatus of the VRRP to perform a master-backup switch, and sending, through the network card 1203, a remote link failure notification to a downlink apparatus of the master apparatus of VRRP to notify the downlink apparatus that a remote link has a failure, thereby causing the downlink apparatus to complete a working channel switch within the MPLS-TP network; and when a notification indicating that the master-backup switch has been performed already is received through the network card 1203 from the original backup apparatus of VRRP, switching to a backup apparatus of the VRRP.

When the apparatus with the processor 1202 is a backup apparatus of VRRP, the processor 1202 is adapted to perform following operations through performing the computer instructions stored in the memory 1201:

when a master-backup switch notification is received through the network card 1203 from an original master apparatus of VRRP, or a remote link switch notification is received through the network card 1203 from an apparatus with a current working channel within the MPLS-TP network after the working channel is switched, switching to a master apparatus of VRRP, and notifying, through the network card 1203, the original master apparatus of VRRP to perform the master-backup switch.

When the apparatus with the processor 1202 is a backup apparatus of VRRP, the processor 1202 is adapted to perform following operations through performing the computer instructions stored in the memory 1201:

receiving, through the network card 1203, a notification carrying a priority of the original master apparatus of VRRP sent by the original master apparatus of VRRP; and when the priority of the original master apparatus of VRRP carried by the notification is lower than a priority of the apparatus with the processor 1202, switching to a master apparatus of VRRP, and notifying, through the network card 1203, the original master apparatus of VRRP to perform the master-backup switch.

When the apparatus with the processor 1202 is a backup apparatus of VRRP, the processor 1202 is adapted to perform following operations through performing the computer instructions stored in the memory 1201:

increasing the priority of the apparatus with the processor 1202 to make the increased priority higher than a priority of the original master apparatus of VRRP;

switching to a master apparatus of VRRP; and sending a notification carrying the increased priority of the apparatus with the processor 1202 to notify, through the network card 1203, the original master apparatus of VRRP to perform the master-backup switch.

When the apparatus with the processor 1202 is a master apparatus of VRRP, the processor 1202 is adapted to perform following operations through performing the computer instructions stored in the memory 1201:

reducing a priority of the apparatus with the processor 1202 to make the priority lower than a priority of the original backup apparatus of VRRP; and notifying, through the network card 1203, the reduced priority to the original backup apparatus of VRRP.

When the apparatus with the processor 1202 is a master apparatus of VRRP, the processor 1202 is adapted to perform following operations through performing the computer instructions stored in the memory 1201:

receiving, through the network card 1203, a notification carrying a priority of the original backup apparatus of VRRP sent by the original backup apparatus of VRRP; and switching the apparatus with the processor 1202 to a backup apparatus of VRRP when the priority of the original backup apparatus of VRRP carried by the notification is higher than a priority of the apparatus with the processor 1202.

Figure 13:
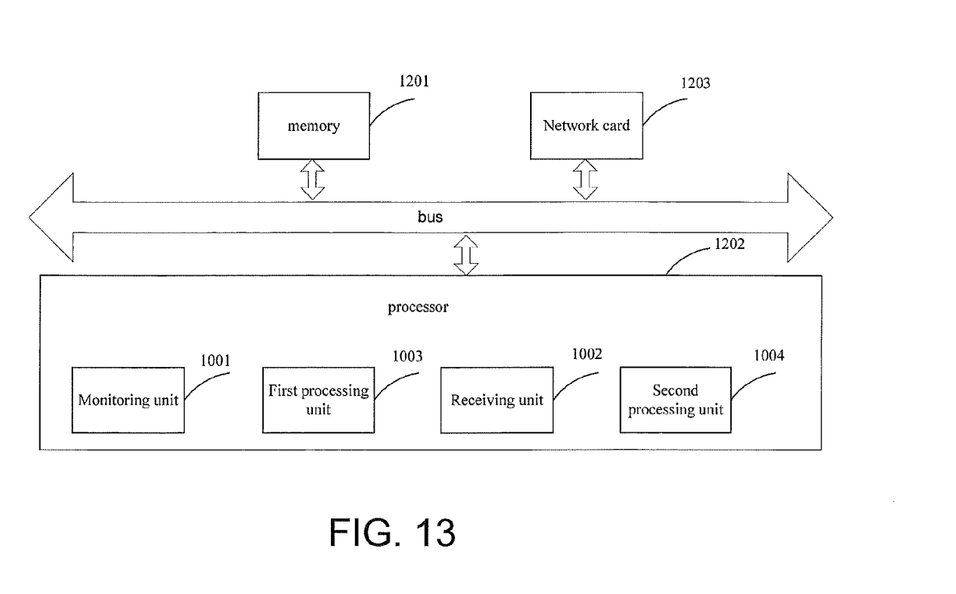
FIG. 13 is a schematic diagram illustrating a physical structure of an apparatus for implementing dual-homed node protection shown in FIG. 10 according to an example of the present disclosure.

It can be seen from the above description, when computer instructions stored in the memory 1201 are performed by the processor 1202, functions of the above-mentioned monitoring unit 1001, the receiving unit 1002, the first processing unit 1003 and the second processing unit 1004 are achieved. The physical structure of the apparatus for implementing the dual-homed node protection shown in FIG. 10 according to the example of the present disclosure may be implemented as shown in FIG. 13.

Figure 14:
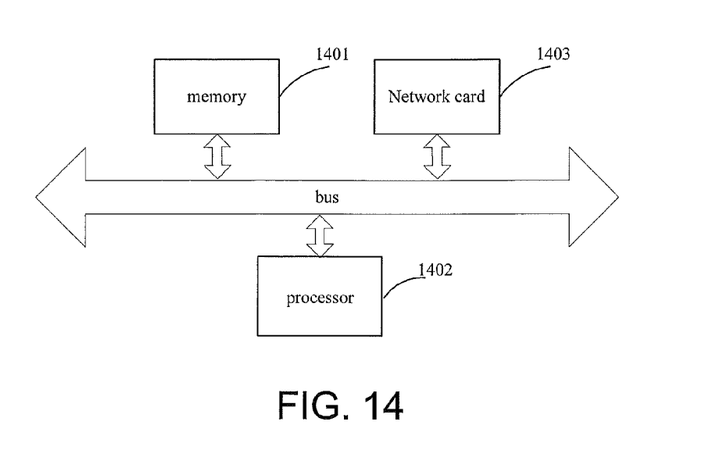
FIG. 14 is a schematic diagram illustrating a physical structure of an apparatus shown in FIG. 11 which is in a MPLS-TP network and connected with an apparatus in a dual-homed node according to an example of the present disclosure.

FIG. 14 is a schematic diagram illustrating a physical structure of an apparatus shown in FIG. 11 which is in a MPLS-TP network and connected with an apparatus in a dual-homed node according to an example of the present disclosure. The apparatus includes a memory 1401, a processor 1402 and a network card 1403, wherein:

the memory 1401 is adapted to store computer instructions;

the processor 1402 is adapted to perform following operations through performing the computer instructions stored in the memory 1401:

receiving, through the network card 1403, a remote link failure notification sent by a master apparatus of VRRP;

switching a working channel within the MPLS-TP network according to a MPLS-TP implementation mode configured for the apparatus with the processor 1402 when the remote link failure notification is received through the network card 1403 from the master apparatus of VRRP; and when a working channel within the MPLS-TP network is switched, and a current working channel within the MPLS-TP network after the switch is located on the apparatus with the processor 1402, notifying, through the network card 1403, an uplink apparatus of the apparatus with the processor 1402 that a remote link is switched to cause the uplink apparatus to complete a master-backup switch within the VRRP.

Preferably, the processor 1402 is adapted to perform following operations through performing the computer instructions stored in the memory 1401:

notifying, through the network card 1403, an apparatus with a protection channel in MPLS-TP network, and negotiating with the apparatus with the protection channel to complete the work channel switch within the MPLS-TP network; or notifying, through the network card 1403, a downlink apparatus of a current master apparatus of VRRP that the remote link has a failure, negotiating with the downlink apparatus of the current master apparatus of VRRP to establish a channel which makes traffic in the working channel communicate with traffic in the channel established through negotiating, and making the downlink apparatus of the current master apparatus of VRRP establish a communication channel between the traffic in the channel established through negotiating and the traffic of the current master apparatus of VRRP.

Figure 15:
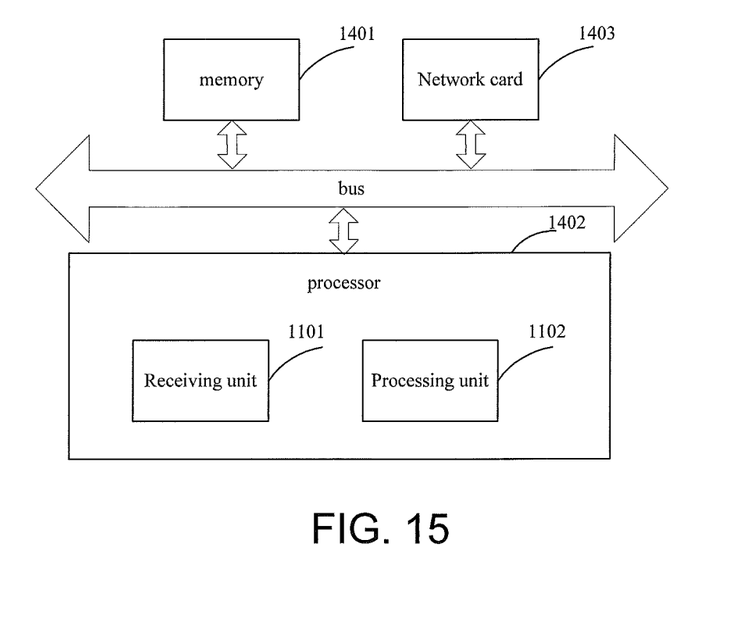
FIG. 15 is a schematic diagram illustrating a physical structure of an apparatus shown in FIG. 11 which is in a MPLS-TP network and connected with an apparatus in a dual-homed node according to an example of the present disclosure.

It can be seen from the above description, when computer instructions stored in the memory 1401 are performed by the processor 1402, functions of the above-mentioned receiving unit 1101 and the processing unit 1102 are achieved. The physical structure of the apparatus shown in FIG. 11 which is in the MPLS-TP network and connected with the apparatus in the dual-homed node according to the example of the present disclosure may be implemented as shown in FIG. 15.

Based on the functionality division in the above-mentioned physical structures, it may be clarified how corresponding blocks of the method for implementing the dual-homed node protection and corresponding units of the apparatus for implementing the dual-homed node protection in accordance with examples of the present disclosure are distributed in the above-mentioned physical structures.

In conclusion, in examples of the present disclosure, when monitoring that an uplink (i.e., an access link) has a failure, a master apparatus of VRRP performs a master-backup switch within VRRP, and notifies a downlink apparatus of the master apparatus of VRRP to perform a working channel switch within a MPLS-TP network; when a working channel within the MPLS-TP network is switched, an apparatus with a current working channel after the working channel switch notifies a backup apparatus of VRRP to perform corresponding master-backup switch. Therefore, problem that the round trip paths between a base station and a core network apparatus appear inconsistent or a link from the core network apparatus to the base station is disconnected when the access link has a failure can be solved.

The above examples can be implemented by hardware, software or firmware or a combination thereof. For example the various methods, processes and functional units described herein may be implemented by a processor (the term processor is to be interpreted broadly to include a CPU, processing unit, ASIC, logic unit, or programmable gate array etc.). The processes, methods and functional units may all be performed by a single processor or split between several processors; reference in this disclosure or the claims to a 'processor' should thus be interpreted to mean 'one or more processors'. The processes, methods and functional units can be implemented as machine readable instructions executable by one or more processors, hardware logic circuitry of the one or more processors or a combination thereof. Further the teachings herein may be implemented in the form of a software product. The computer software product is stored in a non-transitory storage medium and includes a plurality of instructions for making a computer device (which can be a personal computer, a server or a network device such as a router, switch, access point etc.) implement the method recited in the examples of the present disclosure.

The figures are only illustrations of examples, wherein the modules or procedure shown in the figures are not necessarily essential for implementing the present disclosure. The modules in the aforesaid examples can be combined into one module or further divided into a plurality of sub-modules.

The above are just several examples of the present disclosure, and are not used for limiting the protection scope of the present disclosure. Any modifications, equivalents, improvements, etc., made under the principle of the present disclosure, are all included in the protection scope of the present disclosure.

What is claimed is:

1. A method for a master apparatus of a Virtual Router Redundancy Protocol (VRRP) in a dual-homed node that is a part of a dual-homed network to implement a Layer 3 apparatus, the dual-homed network comprising the dual-homed node and a Layer 2 MPLS-Transport Profile (MPLS-TP) network, the method comprising:
   monitoring a state of an uplink;
   when the monitoring detects that the uplink has a failure, notifying an original backup apparatus of the VRRP to perform a master-backup switch, and notifying a downlink apparatus of the master apparatus of the VRRP that a remote link has a failure, thereby causing the downlink apparatus to switch a working channel within the MPLS-TP network; and
   when a notification indicating that the master-backup switch has been performed already is received from the original backup apparatus of the VRRP, switching to a backup apparatus of the VRRP.

2. The method of claim 1, wherein the notifying an original backup apparatus of the VRRP to perform a master-backup switch comprises:
   reducing a priority of the master apparatus of the VRRP to make the reduced priority lower than a priority of the original backup apparatus of the VRRP; and
   notifying the reduced priority to the original backup apparatus of VRRP.

3. The method of claim 1, wherein the switching to a backup apparatus of the VRRP comprises:
   receiving a notification carrying a priority of the original backup apparatus of the VRRP sent by the original backup apparatus of the VRRP; and
   when the priority of the original backup apparatus of the VRRP carried by the notification is higher than the priority of the master apparatus of the VRRP, switching to a backup apparatus of the VRRP.

4. A method for a backup apparatus of a Virtual Router Redundancy Protocol (VRRP) in a dual-homed node that is a part of a dual-homed network to implement a Layer 3 apparatus, the dual-homed network comprising the dual-homed node and a Layer 2 MPLS-Transport Profile (MPLS-TP) network, the method comprising:
   if a master-backup switch notification is received from an original master apparatus of the VRRP or a remote link switch notification is received from an apparatus with a current working channel within the MPLS-TP network after a working channel is switched, switching to a master apparatus of VRRP and notifying the original master apparatus of the VRRP to perform a master-backup switch.

5. The method of claim 4, wherein if a master-backup switch notification is received from an original master apparatus of the VRRP, the switching to a master apparatus of VRRP and the notifying the original master apparatus of the VRRP to perform a master-backup switch comprise:
   receiving a notification carrying a priority of the original master apparatus of the VRRP sent by the original master apparatus of the VRRP; and
   when the priority of the original master apparatus of the VRRP carried by the notification is lower than a priority of the backup apparatus, switching to a master apparatus of the VRRP, and notifying the original master apparatus of the VRRP to perform the master-backup switch.

6. The method of claim 4, wherein if a remote link switch notification is received from an apparatus with a current working channel within the MPLS-TP network after a working channel is switched, the switching to a master apparatus of VRRP and the notifying the original master apparatus of the VRRP to perform a master-backup switch comprise:

increasing the priority of the backup apparatus of the VRRP to make the increased priority higher than a priority of the original master apparatus of VRRP;

switching to a master apparatus of the VRRP; and sending a notification carrying the increased priority of the backup apparatus of the VRRP to notify the original master apparatus of the VRRP to perform the master-backup switch.

7. An apparatus for implementing dual-homed node protection, which is applied to a dual-homed network for implementing a Layer 3 apparatus, wherein the dual-homed network comprises a dual-homed node and a Layer 2 MPLS-Transport Profile (MPLS-TP) network, the apparatus comprising a memory, a processor and a network card, wherein:

the memory is adapted to store computer instructions;

when the apparatus with the processor is a master apparatus of a Virtual Router Redundancy Protocol (VRRP), the processor is adapted to perform following operations through performing the computer instructions stored in the memory:

monitoring a state of an uplink;

when the monitoring detects the uplink has a failure, notifying, through the network card, an original backup apparatus of the VRRP to perform a master-backup switch, and notifying, through the network card, a downlink apparatus of the master apparatus of the VRRP that a remote link has a failure, thereby causing the downlink apparatus to switch a working channel within the MPLS-TP network; and when a notification indicating that the master-backup switch has been performed already is received through the network card from the original backup apparatus of the VRRP, switching to a backup apparatus of the VRRP.

8. The apparatus of claim 7, wherein the processor is further adapted to perform following operations through performing the computer instructions stored in the memory:

reducing a priority of the master apparatus of the VRRP to make the reduced priority lower than a priority of the original backup apparatus of the VRRP; and notifying, through the network card, the reduced priority to the original backup apparatus of the VRRP.

9. The apparatus of claim 7, wherein the processor is further adapted to perform following operations through performing the computer instructions stored in the memory:

receiving, through the network card, a notification carrying a priority of the original backup apparatus of the VRRP sent by the original backup apparatus of the VRRP; and when the priority of the original backup apparatus of the VRRP carried by the notification is higher than the priority of the master apparatus of the VRRP, switching to a backup apparatus of the VRRP.

* * * * *